(12) United States Patent
Morisaki

(10) Patent No.: US 11,126,156 B2
(45) Date of Patent: Sep. 21, 2021

(54) CYCLE TIME ESTIMATOR

(71) Applicant: FANUC Corporation, Yamanashi (JP)

(72) Inventor: Kazuhiko Morisaki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/555,104

(22) Filed: Aug. 29, 2019

(65) Prior Publication Data

US 2020/0073360 A1 Mar. 5, 2020

(30) Foreign Application Priority Data

Sep. 5, 2018 (JP) .............................. JP2018-166340

(51) Int. Cl.
| | |
|---|---|
| *G05B 23/02* | (2006.01) |
| *G05B 19/406* | (2006.01) |
| *G05B 19/418* | (2006.01) |
| *G05B 19/408* | (2006.01) |

(52) U.S. Cl.
CPC ......... *G05B 19/406* (2013.01); *G05B 19/408* (2013.01); *G05B 19/41865* (2013.01); *G05B 23/0272* (2013.01); *G05B 2219/31407* (2013.01); *G05B 2219/31412* (2013.01); *G05B 2219/37336* (2013.01)

(58) Field of Classification Search
CPC .......................... G05B 19/406; G05B 23/0272
USPC ....................................................... 700/174
See application file for complete search history.

(56) References Cited

U.S. PATENT DOCUMENTS

| | | | |
|---|---|---|---|
| 8,843,230 B2 | 9/2014 | Mizuno et al. | |
| 9,836,044 B2 | 12/2017 | Yamada et al. | |
| 10,018,992 B2* | 7/2018 | Ishiwari ............. | G05B 19/4155 |
| 2009/0326680 A1* | 12/2009 | Landgraf ........... | G05B 19/4069 |
| | | | 700/49 |
| 2012/0007536 A1* | 1/2012 | Iwashita ............ | G05B 19/4069 |
| | | | 318/573 |
| 2016/0026167 A1* | 1/2016 | Yamada ........... | G05B 19/41865 |
| | | | 700/174 |
| 2017/0038764 A1* | 2/2017 | Ito ....................... | G05B 19/4063 |
| 2017/0168698 A1 | 6/2017 | Sakamoto et al. | |
| 2017/0205804 A1 | 7/2017 | Kuroki | |
| 2017/0227952 A1 | 8/2017 | Taira | |
| 2017/0242408 A1 | 8/2017 | Ortseifen et al. | |
| 2020/0183359 A1* | 6/2020 | Nishino ............. | G05B 19/4093 |

FOREIGN PATENT DOCUMENTS

| | | |
|---|---|---|
| JP | 2017111516 A | 6/2017 |
| JP | 2017126199 A | 7/2017 |
| WO | 2015159365 A1 | 10/2015 |

* cited by examiner

*Primary Examiner* — Hien D Khuu
(74) *Attorney, Agent, or Firm* — Hauptman Ham, LLP

(57) ABSTRACT

A cycle time estimator is a device configured to calculate for each block the time required for movement along a tool path specified by a NC command. The cycle time estimator divides the NC command into blocks, divides the tool path into segments, calculates segment travel times individually for the segments, and holds the correspondence between the blocks and the segments. The cycle time estimator further calculates block travel times by integrating the segments individually for the blocks and displays the blocks and the block travel times in association with one another in an editing screen for the NC command.

3 Claims, 4 Drawing Sheets

FIG.3

| BLOCK ID | BLOCK TRAVEL TIME |
|---|---|
| 1 | 0 |
| 2 | XXXXX |
| 3 | XXXXX |
| 4 | 0 |
| 5 | XXXXX |
| : | : |

— 120

| TOTAL BLOCK NUMBER |
|---|
| N |

| MAXIMUM VALUE OF BLOCK TRAVEL TIME |
|---|
| YYYY |

FIG.4

```
O0001   O0001 (PROGRAM)
        G54
        G99 G00 X150. Z150. ;
XXXms   (M/ POCKET SIDE FINISHING) ;
XXXms   M50
XXXms   M49
XXXms   M46
XXXms   G54
XXXms   T53000
XXXms   M08
XXXms   G97 S531 M13
XXXms   G98 G00 X110.865 ;
XXXms   T53053 ;
XXXms   Z13. ;
XXXms   C0. ;
XXXms   C133.538 ;
XXXms   G01 Z-7. F100. ;
XXXms   Z-10. F212. ;
XXXms   G121 ;
XXXms   G17 G41 X116.664 C-2.755 F424. ;
XXXms   G03 X119.961 C1.531 I-4.35 J4.133 ;
XXXms   X-119.961 C-1.531 I-59.981 J-1.531 ;
XXXms   X119.961 C1.531 I59.981 J1.531 ;
XXXms   X116.231 C5.727 I-5.998 J-0.153 ;
XXXms   G01 G40 X110.72 C2.828 ;
XXXms   Z13 F100. ;
XXXms   G13.1 ;
XXXms   G00 X49.403 C-2.478 ;
XXXms   G01 Z-7. F100. ;
XXXms   Z-10. F212. ;
XXXms   G12.1 ;
XXXms   G41 X47.001 C3.815 F424. ;
XXXms   G03 X39.963 C0.865 I1.802 J-5.723 ;
XXXms   G01 X21.479 C-16.872 ;
XXXms   X-39.963 C-0.865 ;
XXXms   X-21.479 C16.872 ;
XXXms   X18.484 C17.737 ;
XXXms   X39.963 C0.865 ;
XXXms   G03 X47.484 C-1.771 I5.062 J3.222 ;
XXXms   G01 X49.219 C2.134 ;
```

Estimation total: XXXX.XXXs

CYCLE TIME ESTIMATOR

RELATED APPLICATIONS

The present application claims priority to Japanese Patent Application Number 2018-166340 filed on Sep. 5, 2018, the disclosure of which is hereby incorporated by reference herein in its entirety.

BACKGROUND OF THE INVENTION

Field of the Invention

The present invention relates to a cycle time estimator, and more particularly, to a cycle time estimator by which the result of estimation of a machining time for each block can be visually recognized with ease.

Description of the Related Art

In creating and modifying a numerical control (NC) program, a cycle time (total machining time) for the NC program may sometimes be expected to be confirmed. In particular, there is a requirement for the confirmation of appropriate parts in the NC program and times required for their processing.

Conventionally, as a method for confirming the cycle time of an NC program, the NC program may be run by actually activating an industrial machine (hereinafter simply referred to as "machine") including a machine tool. According to alternative methods, software may be used to estimate the machining time of the NC program.

The methods described in the following patent documents are examples of the alternative methods. US. Patent Application Publication No. 8843230 discloses a device that calculates the moving speed of a tool based on various conditions and estimates the cycle time based on the tool moving speed. U.S. Patent Application Publication No. 9836044 discloses a device that can reduce the time required for a modification process by previously dividing an NC program into a plurality of sections (masses of blocks) and re-estimating the machining time for only those sections in which program texts are modified. U.S. Patent Application Publication No. 2017/0227952 discloses a device that estimates the machining time in units of necessary blocks. U.S. Patent Application Publication No. 2017/0242408 discloses a device that estimates the machining time in units of segments.

An operator generally optimizes the NC program by repeating two operations "creation or modification of the NC program" and "confirmation of the cycle time based on the NC program concerned". Specifically, the operator visually recognizes appropriate parts in the created or modified program texts and processing times required therefor and repeats an operation for re-modification as required. Thus, the operation conducted by the operator can be made efficient if he/she can visually recognize the correspondence between the program texts and the processing times with ease.

According to the methods described in the above patent documents, however, it is difficult to visually recognize the appropriate parts and the processing times required therefor, although total machining times before and after the modification of the NC program can be compared. Thus, workloads for searching the time-consuming parts in the NC program increase, for example.

Moreover, according to the methods described in the above patent documents, the operator is forced to perform confirmation of the cycle time and NC program editing in separate screens. Thus, the flow of his/her operation is inevitably interrupted, so that the operability is reduced.

SUMMARY OF THE INVENTION

The present invention has been made to solve the above problems and has an object to provide a cycle time estimator that enables an operator to visually recognize the result of estimation of a machining time for each block with ease.

A cycle time estimator according to the present invention is a device configured to calculate for each block the time required for movement along a tool path specified by a NC command and comprises an NC command decoder configured to divide the NC command into blocks, a segment data generator configured to divide the tool path into segments, a segment travel time calculator configured to calculate segment travel times individually for the segments, a storage configured to hold the correspondence between the blocks and the segments, and a block travel time calculator configured to calculate block travel times by integrating the segments individually for the blocks and display the blocks and the block travel times in association with one another in an editing screen for the NC command.

In a cycle time estimator according to one embodiment of the present invention, the block travel time calculator displays the block travel time at the line head of a program text of the block concerned in the editing screen for the NC command.

In the cycle time estimator according to the one embodiment of the present invention, the block travel time calculator displays a background color of a scroll bar in a position corresponding to the block concerned with a display color corresponding to the block travel time in the editing screen for the NC command.

In the cycle time estimator according to the one embodiment of the present invention, the block travel time calculator displays a list in which the blocks and the block travel times are associated with one another and transits to the editing screen for any one of the blocks selected from the list.

According to the present invention, there can be provided a cycle time estimator that enables an operator to visually recognize the result of estimation of a machining time for each block with ease.

BRIEF DESCRIPTION OF THE DRAWINGS

The above and other objects and features of the present invention will be obvious from the ensuing description of embodiments with reference to the accompanying drawings, in which:

FIG. 3 is a diagram showing an example of storage contents of a block travel time storage shown in FIG. 2; and FIG. 4 is a diagram showing a display example of block travel times provided by the cycle time estimator according to the embodiment of the present invention.

DETAILED DESCRIPTION OF THE PREFERRED EMBODIMENTS

A cycle time estimator 1 according to the present embodiment estimates the cycle time with the similar structure as that of the cycle time estimator described in US. Patent Application Publication No. 8843230. Specifically, the cycle time estimator 1 divides a tool path into fine sections called segments and obtains a speed curve representative of tangential speed changes from the respective start points of the segments to the end points. The cycle time estimator 1 calculates the time required for the tool to move through the segments on the assumption that the tool moves along the obtained speed curve. The time required for the tool to cover the entire cool path is given by the sum of travel times for the segments. The cycle time estimator 1 improves the precision of calculated machining times by setting the speed curve through adoption of constraints on the speed settled by a speed difference, acceleration difference, and jerk difference between the adjacent segments, tool path curvature, and the number of segment data used for the speed calculation. The cycle time estimator 1 can deal with the tool operation as a one-dimensional problem that handles a tangential speed without decomposing it into operations of individual axes, so that the processing time can be reduced. Moreover, the cycle time estimator 1 enables the adjustment of estimated values of the travel times and the precision of the estimated values by making the intervals of division into the segments variable.

In addition, the cycle time estimator 1 newly provides a device or similar means for estimating the machining time for each block and a device or similar means configured to display the estimated machining time for each block so that an operator can visually recognize it with ease.

Figure 1:
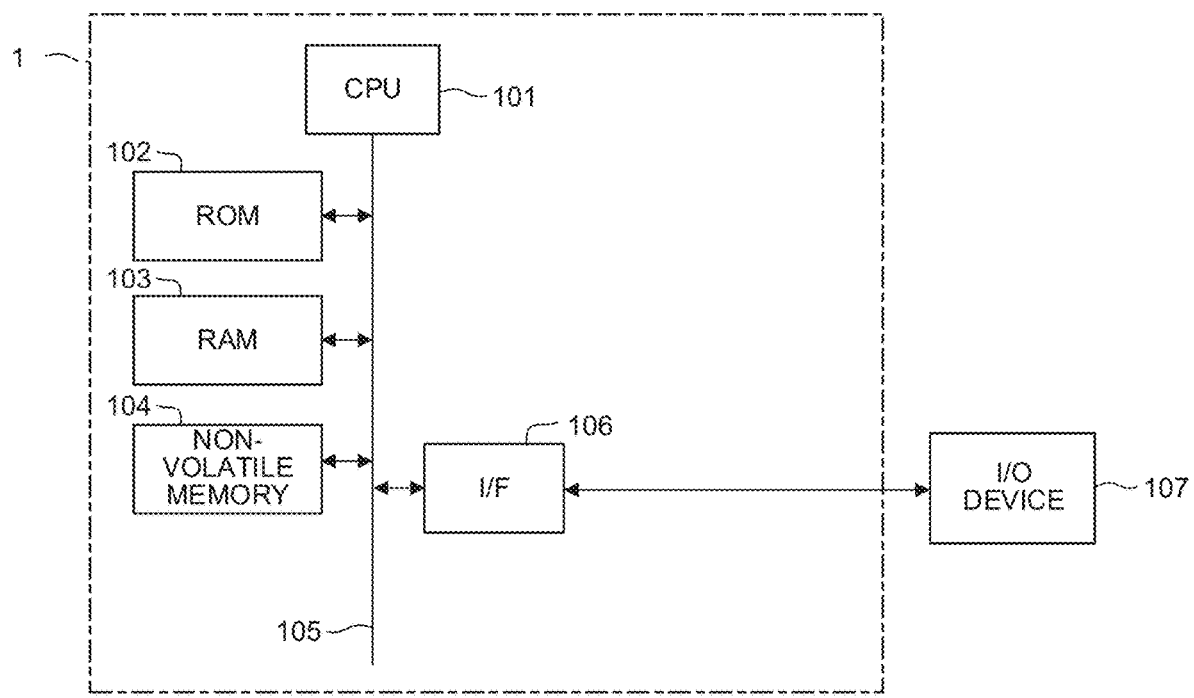
FIG. 1 is a diagram showing an exemplary hardware constitution of a cycle time estimator according to an embodiment of she present invention.

FIG. 1 is a schematic hardware constitution diagram showing principal parts of the cycle time estimator 1 according to the present embodiment. The cycle time estimator 1 is, for example, a numerical controller for controlling a machine. Alternatively, the cycle time estimator 1 may be an information processor such as a PC (personal computer) used for the creation and modification of the NC program or cycle time estimation.

The cycle time estimator 1 comprises a central processing unit (CPU) 101, a read-only memory or ROM 102, a random access memory or RAM 103, a non-volatile memory 104, a bus 105, and an interface (I/F) 106. Moreover, an input/output (I/O) device 107 is connected to the interface 106.

The CPU 101 is a processor for generally controlling the cycle time estimator 1. The CPU 101 reads out a system program stored in the ROM 102 via the bus 105 and controls the entire cycle time estimator 1 according to the system program.

The ROM 102 is previously loaded with the system program.

The RAM 103 is temporarily loaded with temporary calculation data and display data, data and programs input by the operator via the I/O device 107 and the like.

The non-volatile memory 104 is backed up by, for example, a battery (not shown) so that its storage state can be maintained even when the cycle time estimator 1 is switched off. The non-volatile memory 104 stores data, programs, and the like which are input through the I/O device 107. The programs and data stored in the non-volatile memory 104 may be developed in the RAM 103 during execution and use.

The I/O device 107 is a device that is equipped with a display device and an input device and serves to input and output data, and typically, comprises a manual data input (MDI) device, a control panel, a touch panel, a display, a keyboard, a mouse and the like. The I/O device 107 displays information received from the CPU 101 via the interface 106 on the display device. The I/O device 107 delivers commands and data input from the input device to the CPU 101 via the interface 106.

Figure 2:
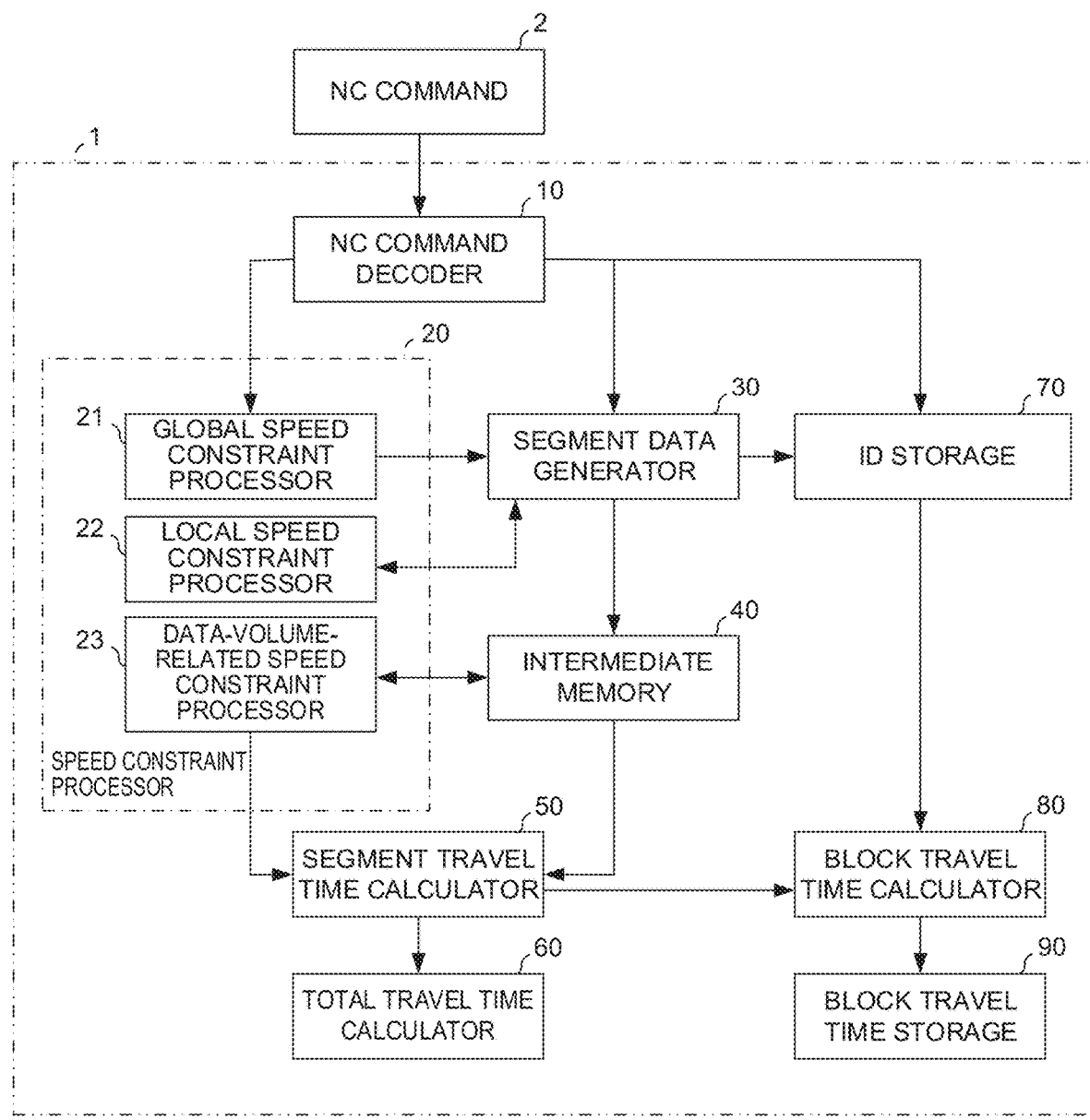
FIG. 2 is a diagram showing an exemplary functional constitution of the cycle time estimator according to the embodiment of the present invention.

FIG. 2 is a block diagram showing a schematic functional constitution of the cycle time estimator 1. The cycle time estimator 1 comprises a NC command decoder 10, a speed constraint processor 20, a segment data generator 30, an intermediate memory (buffer) 40, a segment travel time calculator 50, and a total travel time calculator 60. In addition, the cycle time estimator 1 comprises an ID storage 70 for identifier (ID) storage (in other words, block ID-segment ID storage 70), a block travel time calculator 80, and a block travel time storage 90.

The NC command decoder 10 receives an NC command (machining program) 2 as an input, decodes its contents, and divides it into command data for individual blocks described in the NC command 2, thereby generating block data. The input NC command 2 is the same as that input to a CNC (numerical controller) and may be in any form, e.g., binary data stored in a text file or a program memory of the CNC.

The block data generated by the NC command decoder 10 represents the command contents of each block that constitutes the NC command (machining program) 2. The block data includes information on the start and end points of the block, the type (e.g., straight line or circular arc) of a path from the start point to the end point, information (e.g., center position for the case of the circular arc) that fixes the path, and speed information on the tool moving through the block.

The speed constraint processor 20 comprises a global speed constraint processor 21, a local speed constraint processor 22, and a data-volume-related (data-volume-dependent) speed constraint processor 23.

The global speed constraint processor 21 compares a command speed Vc commanded by the NC command (machining program) 2 and a speed Via predetermined in accordance with the curvature of the tool path and sets the smaller of these values as an upper-limit speed Vlim. Data on the command speed Vc and data on the curvature of the tool path are based on the block data generated by the NC command decoder 10. The data on the speed Via predetermined in accordance with the curvature of the tool path is stored in a memory (not shown) in advance. In calculating the travel time of the tool subjected to speed override, a speed obtained by multiplying the command speed Vc by an override rate is used in place of the command speed Vc itself. The local speed constraint processor 22 and the data-volume-related speed constraint processor 23 that use the segment data will be described later.

The segment data generator 30 receives the block data generated by the NC command decoder 10 and divides the tool path from the start points to the end points of the individual blocks into segments. In this dividing method, a division speed Vd is obtained by multiplying the command speed Vc by a predetermined coefficient k or a coefficient fixed based on the curvature of the tool path, and the segments are sequentially cut out from the start points of the blocks at division intervals equivalent to distances Vd·τ obtained by multiplying the division speed Vd by a predetermined time τ. The individual segments generated in this manner are fine sections of the tool path. If the length of each segment is L, it can be given by L=Vd·τ. The predetermined time τ is assumed to be equal to or longer than an interpolation cycle.

The fine cut-out sections are accumulated (or stored) as the segment data in the intermediate memory (buffer) 40. The segment data accumulated (or stored) in the intermediate memory 40 include the length L of each segment, the direction of each segment (vector directed from the start point toward the end point), the upper-limit speed, and a corner speed Vr obtained by the local speed constraint processor 22.

The local speed constraint processor 22 obtains the maximum of speeds such that the speed difference, acceleration difference, and jerk difference between the adjacent ones of the segments generated by the segment data generator 30 are within their respective predetermined tolerances. The obtained maximum speed is assumed to be the corner speed Vr at the junction between each two adjacent segments. The curvature of the tool path may be taken into account by the local speed constraint processor 22 in place of the global speed constraint processor 21. The segment data with the values set in this manner are accumulated (or stored) in the intermediate memory (buffer) 40.

The data-volume-related speed constraint processor 23 is a device or other means configured to improve the precision of calculated machining times by adopting the constraints on the travel time of the tool that depends on the number of segment data. The above-mentioned processor 23 is a processor provided to reproduce in the cycle time estimator the phenomenon that the constraints on the speed are settled by the number of data read in by look-ahead processing.

The data-volume-related speed constraint processor 23 forms a speed curve U(t) called a deceleration curve representative of speed changes toward a leading segment accumulated in the intermediate memory (buffer) 40, on the assumption that a predetermined speed Ua is reached at the end point of a trailing segment (segment generated last) of the intermediate memory 40. Since the tool cannot move at a speed exceeding the speed curve U(t), this value U(t) is called the maximum allowable speed. Although the predetermined speed Ua is normally 0, it may alternatively be at another finite value.

The segment travel time calculator 50 takes out one of the segment data from the top of the intermediate memory (buffer) 40 and calculates the time required for the movement through the segment concerned. If the segment length, the time at the start point of the segment, and the speed curve for the moving speed of the tool at a time t are indicated as L, 0 and V(t), respectively, the time (T) required for the movement through an arbitrary segment satisfies the following formula:

$$\int_0^T V(t)dt = L$$

where the speed curve V(t) represents the time derivative of a distance s(t) measured along the tool path.

The total travel time calculator 60 sets a value obtained by integrating the travel times for the individual segments as a total travel time.

In the present embodiment, the NC command decoder 10 is expected to store a block identifier (ID) capable of uniquely identifying a block into the block ID-segment ID storage 70. Moreover, the segment data generator 30 is expected to store a segment identifier (ID) capable of uniquely identifying a segment in association with the block ID of the division source of the segment concerned into the block ID-segment ID storage 70. Furthermore, the segment travel time calculator 50 outputs calculated segment travel times along with segment IDs to the block travel time calculator 80.

The block travel time calculator 80 sequentially acquires the segment travel times and the segment IDs output by the segment travel time calculator 50. The block travel time calculator 80 identifies block IDs corresponding to segment IDs with reference to the ID storage 70 and integrates the segment travel times in units of block IDs. The resulting integrated value is called a block travel time. The block travel time calculator 80 stores the block travel time storage 90 with the block travel times and the block IDs in association with one another. Moreover, the block travel time calculator 80 stores the block travel time storage 90 with a total block number N included in the NC command 2 and the maximum value of the block travel time. The maximum value of the block travel time indicates the maximum of an N number of block travel times calculated by the block travel time calculator 80.

FIG. 3 is a diagram showing an example of storage contents 120 of the block travel time storage 90. The block travel time storage 90 includes a correspondence table for the block IDs and the block travel times. This table is loaded with the block travel times corresponding to the individual block IDs based on all the block IDs included in the NC command 2 as keys. Moreover, the block travel time storage 90 stores the total block number N and the maximum value of the block travel time.

As shown in FIG. 4, the block travel time calculator 80 makes an editing screen for the NC program display a button (cycle time estimation button 132) for calculating the cycle time of the NC program being edited. Alternatively, the block travel time calculator 80 may be configured to assign to a software key a function of calculating the cycle time of the NC program being edited. When the block travel time calculator 80 detects selection of the button or software key concerned, it calculates the total travel time and the block travel time for each block by the series of processing steps described above. The block travel time calculator 80 displays a calculated total travel time 134 in an arbitrary position in the editing screen for the NC program. Moreover, the block travel time calculator 80 stores the block travel time storage 90 with the block travel time for each block.

If the block travel time storage 90 is stored with the block travel time for each block, they block travel time calculator 80 displays a block travel time 136 in the editing screen for the NC program. As shown in FIG. 4, for example, the block travel time calculator 80 can numerically display the block travel time for the block corresponding to each block ID at the line head or the like of the block concerned. The display positions of the numerical values are given by way of example only and may be alternatively any positions provided that the correspondence between the blocks and the block travel times can be clearly visually recognized.

As shown in FIG. 4, the block travel time calculator 80 may be configured to express the block travel time for the block corresponding to each block ID by changing the background color of a scroll bar 138 in a position corresponding to the block concerned. For example, the length of the block travel time 136 for each block can be expressed by background colors of 10 stages according to the following procedures.

(1) The block travel time calculator 80 obtains the coordinates of a pixel row corresponding to the block by dividing the total height of the scroll bar by the total block number N.

(2) The block travel time calculator 80 divides the machining time into 10 ranges by dividing a maximum value YYYYY of the block travel time by 10 (the number of display stages).

(3) The block travel time calculator 80 determines the range that includes the block travel time for each block. The display assigns a display color to each range, thereby determining the display color corresponding to the block concerned.

(4) The block travel time calculator 80 draws the pixel row corresponding to the block concerned with the obtained display color.

The method for displaying the scroll bar 138 with color codes is given by way of example only and the present invention is not limited to this. The block travel time calculator 80 can, for example, also display an appropriate part in the NC program and a required time by the following method.

(a) The block travel time calculator 80 displays the block travel times (numerical values) at the block line heads, the blocks themselves (program texts), or their background colors based on color coding, not the scroll bar 138.

(b) The block travel time calculator 80 displays the scroll bar 138 with classified luminances, not colors.

(c) The block travel time calculator 80 displays a list that sorts the blocks in descending order of the block travel time. In the list, for example, the block IDs or some of the program texts may be displayed as list items. When the list items are selected, the display transits to the NC program editing screen for the block concerned.

(d) If the estimated machining time is equal to or smaller than a threshold value, the block travel time calculator 80 never displays the block travel time (numerical value) for the block concerned and the background color indicative of the block travel time. Alternatively, the block travel time calculator 80 does not display the block concerned in the list of (c).

According to the present embodiment, the cycle time estimator 1 can calculate the estimated machining time (block travel time) for each block and display the block travel time 136 in the NC program editing. Thus, the operator (or worker) can intuitively identify the appropriate part in the NC program and the required time, so that the visibility can be improved.

Moreover, according to the present embodiment, the cycle time estimator 1 directly associates the blocks and the block travel times and displays the block travel time 136 by the numerical values at the NC program line heads, the display colors of the scroll bar and the like, the list, and the like. Therefore, the operator can immediately find out that part of the NC program which requires much processing time and quickly move to and edit the part concerned. Thus, the trouble of looking for and modifying the time-consuming part can be saved, so that the burden on the operator (or worker) can be reduced.

Furthermore, according to the present embodiment, a single screen can serve for "creation or modification of the NC program" and "confirmation of the cycle time based on the NC program concerned". Thus, the flow of the operation conducted by the operator cannot be interrupted, so that the operability can be improved.

The invention claimed is:

1. A cycle time estimator configured to calculate for each block a time required for movement along a tool path specified by a numerical control (NC) command, the cycle time estimator comprising: a display; and a processor configured to: divide the NC command into blocks, divide the tool path into segments, calculate segment travel times individually for the segments, store the correspondence between the blocks and the segments, calculate block travel times by integrating the segments individually for the blocks, and cause the display to display the blocks and the block travel times in association with one another in an editing screen for the NC command, wherein the processor is further configured to cause the display to change a background color of a scroll bar in a position corresponding to a concerned block, among the blocks, with a display color corresponding to the block travel time associated with the concerned block in the editing screen for the NC command.

2. The cycle time estimator according to claim 1, wherein the processor is further configured to cause the display to display each of the block travel times at a line head of a program text of an associated block among the blocks in the editing screen for the NC command.

3. The cycle time estimator according to claim 1, wherein the processor is further configured to cause the display to
- display a list in which the blocks and the block travel times are associated with one another, and
- transit to the editing screen for any one of the blocks selected from the list.

* * * * *